Patented Jan. 13, 1953

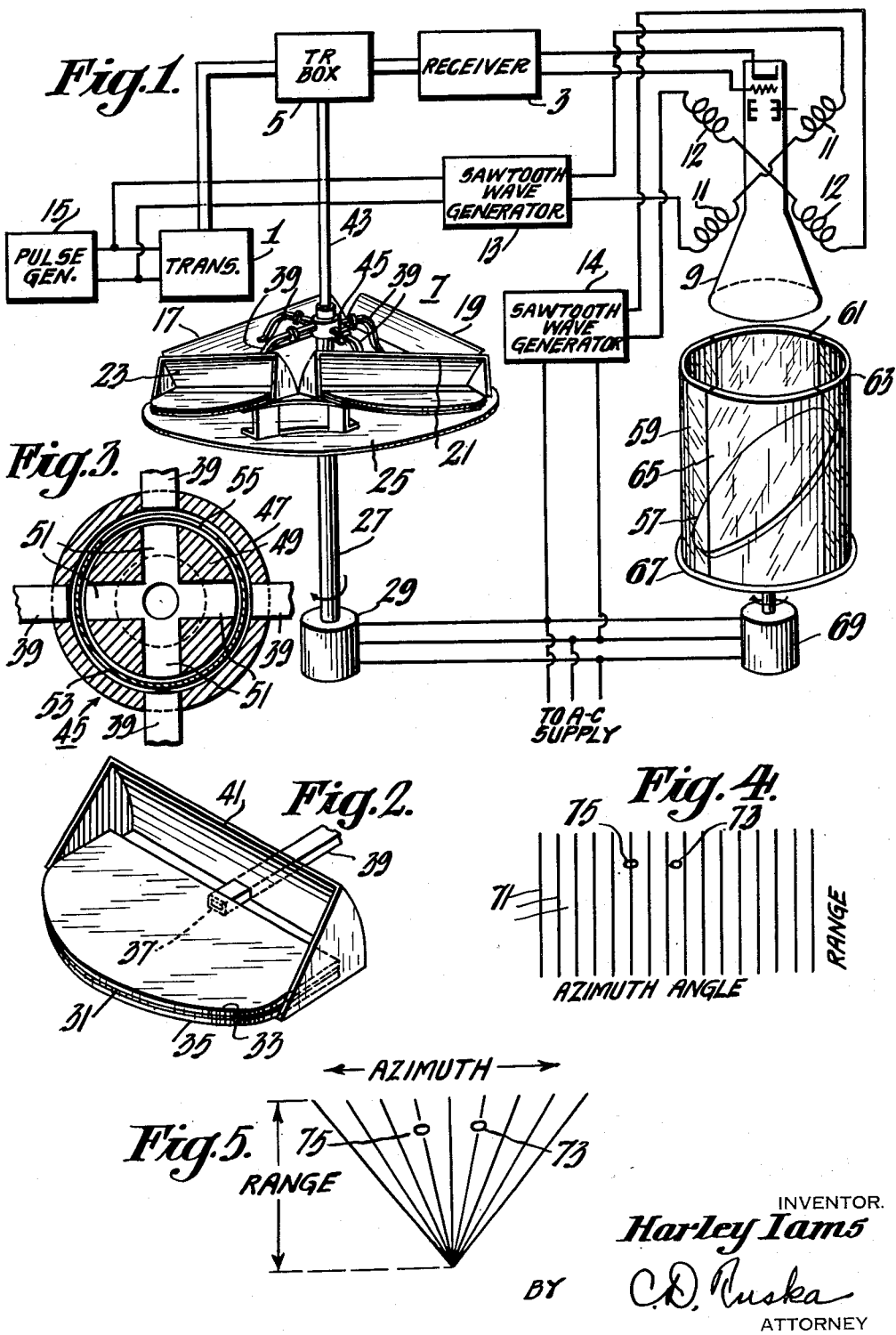

2,625,679

UNITED STATES PATENT OFFICE 2,625,679

RADAR SCANNING SYSTEM

Harley Iams, San Diego, Calif., assignor to Radio Corporation of America, a corporation of Delaware Application September 18, 1947, Serial No. 774,751

2 Claims. (Cl. 343—11)

This invention relates to directional transmission and reception of energy, such as radio or sound waves, and its principal object is to provide improved methods of and means for scanning a volume of space with such energy and using the signals obtained to produce a three-dimensional representation of the field of view.

More specifically, it is an object of this invention to provide three-dimensional information by scanning along two coordinates, for example azimuth and elevation. Ordinarily, such two-coordinate scanning is accomplished by moving a single pencil-shaped beam to trace successive elements or lines across the space to be scanned, or by simultaneously moving two orthogonally disposed fan shaped beams in directions at right angles to each other. Either of said methods requires extremely high rates of scanning to cover a reasonably large field at a repetition rate comparable with persistence of vision. It is a further object of this invention to provide two-coordinate scanning by moving a pair of fan shaped beams along only one of said coordinates, at a speed corresponding to the field repetition frequency rather than at a much higher speed corresponding to the line or element repetition frequency.

Other objects and advantages of the invention will become apparent upon consideration of the following description, with reference to the accompanying drawing wherein:

Fig. 1 is a schematic diagram of a radar system embodying the invention,

Fig. 2 is a perspective view of one of the antenna elements of the system of Fig. 1, Fig. 3 is a plan view in section of a distributor device used in the system of Fig. 1, Fig. 4 is a diagram of a typical display provided by the system of Fig. 1, and Fig. 5 is a diagram of a modified type of display.

Referring to Fig. 1, a radio transmitter 1 is connected to an antenna assembly 7 and a receiver 3 is also coupled through a duplexing device 5, which may be of the type ordinarily known as a TR box, to the antenna assembly 7. The output circuit of the receiver 3 is connected to the beam intensity control electrode of a cathode ray oscilloscope tube 9. The tube 9 is provided with conventional beam deflection means such as coils 11 and 12 which are energized by sawtooth wave generators 13 and 14 respectively.

A pulse generator 15 modulates the transmitter 1 to produce periodic pulses of radio frequency energy which are applied to the antenna 7. The generator 15 also synchronizes the sawtooth generator 13 to initiate a linear trace of the cathode ray beam along one coordinate on the screen of the cathode ray tube 9 coincidentally with each pulse in the output of the transmitter 1.

The antenna assembly 7 comprises four fan beam radiators 17, 19, 21 and 23 mounted on a turntable 25. All of these radiators are substantially alike, and one of them is shown in more detail in Fig. 2. The radiators are supported in tilted positions on the turntable 25, alternately inclined about 10 degrees to one side and about 10 degrees to the other side of the vertical axis. The angles are different, due consideration being given to sensing. Thus, if one angle of inclination is positive, the other is negative. The turntable 25 is supported on the vertical shaft 27 of a synchronous motor 29. The sawtooth generator 14 is synchronized with the rotation of the turntable 25, either by connection as shown to the power supply of the motor 29 or by some other known means, to cause the beam of the cathode ray tube 9 to scan along a second coordinate in accordance with the rotation of the turntable 25.

Turning now to Fig. 2, each of the radiator elements is of the type known as a "pillbox" comprising a narrow parabolic reflector 31 bounded by parallel conductive sheets 33 and 35 and facing the mouth 37 of a waveguide 39. A second parabolic reflector 41, curved in the vertical plane, faces the opening of the reflector 31. Energy applied to the waveguide 39 is radiated from the mouth 37 to the reflector 31, which produces a beam which is substantially confined to a plane perpendicular to the sheets 33 and 35 but is comparatively wide in said plane. The reflector 41 determines the spreading of the beam in the vertical plane, providing a fan shape beam lying in the plane perpendicular to the sheets 33 and 35.

The waveguides 39 from the radiators 17, 19, 21 and 23 are coupled to the waveguide 43 from the transmitter 1 (Fig. 1) through a rotary distributor device 45. Referring to Fig. 3, the distributor 45 includes an outer casing 47 which rotates with the waveguides 39 and the antenna assembly, and an inner core 49 which is cut out as shown at 51 to form extensions of the waveguides 39. The core 49 also rotates with the antenna assembly. An annular conductive sleeve 53 is provided between the members 47 and 49. The sleeve 53 remains stationary. The waveguide 43 is coupled through a suitable fitting to the center of the cut out portions 51 of the core 49. The sleeve 53 includes an arcuate orifice 55. As the antenna assembly rotates the waveguides 39 and their counterparts in the cut out portion 51 successively uncover the orifice 55, so that one radiator at a time is coupled to the main waveguide 43.

The cathode ray tube 9 may be mounted in a vertical position, as shown in Fig. 1, above a diagonal mirror 57. The mirror 57 is surrounded by a cage formed of sheets 59, 61, 63 and 65 of transparent light polarizing material. The planes of polarization of the sheets are tilted alternately at right angles to each other, each being at an angle 45 degrees to the vertical. The transparent cage is supported on a turntable 67 which is rotated by a motor 69 in synchronism with the rotation of the antenna assembly 7.

In the operation of the described system, the continuous rotation of the antenna assembly 7 causes the antennas 17, 19, 21 and 23 to be connected in succession to the main wave guide 43. The opening 55 in the distributor device 45 extends through an angle of about 90 degrees. Thus, supposing that when the asembly is in the position shown in Fig. 1 the antenna 17 has just been connected to the wave guide 43, it will remain connected until it has rotated to the position now occupied by the antenna 19.

Coincidentally with the transmission of each pulse, the beam of the cathode ray tube 9 starts to sweep along one of the scanning lines 71 (Fig. 4), beginning at the bottom and moving toward the top. Each of the lines 71 is displaced laterally with respect to the previous line, and each corresponds to a particular position in azimuth of the antenna 17.

When the fan beam from the antenna 17 strikes a target, some of the energy is reflected back, picked up by the antenna, and applied to the receiver 3. The resulting output pulse from the receiver 3 momentarily intensifies the beam of the cathode ray tube 9, producing a bright spot or "pip" 73 on the screen, shown in Fig. 4. The position of the spot 73 along the scanning line depends upon the time required for radiation to travel from the antenna to the target and back to the antenna, and corresponds to the range. The position of the spot 73 laterally of the display in Fig. 4 depends on the angular position in azimuth of the antenna 17 at the time the target intercepts the fan beam.

The fan beam of the antenna 17 is tilted to the left, say ten degrees from the vertical. Thus, as the beam is swept from left to right across the sector of space being scanned, it will strike an elevated target later than it would if the target were at the same azimuth but at a lower elevation. Consequently the spot 73 appears laterally to the right of the position on the display corresponding to the true azimuth of the target, by an amount which depends on the elevation of the target.

As the antenna 17 completes its scan, it is disconnected and the antenna 23 comes into action. The antenna 23 is tilted to the right of the vertical and therefore its beam will strike an elevated target earlier in the scanning period than the time corresponding to the true azimuth. This produces the spot 75 in the cathode ray display, to the left of the spot 73. The point corresponding to the true azimuth of the target is midway between the spots 73 and 75.

The antenna 23 is followed by the antenna 21, which is tilted to the left like the antenna 17, and is in turn succeeded by the antenna 19, tilted to the right. As the assembly rotates, the spots 73 and 75 are produced alternately on the face of the cathode ray tube 9 at a repetition period depending upon the speed of rotation. This period is preferably made shorter than that of persistence of vision, so that both spots appear to be present continuously. Since there are four antennas on the turntable 25 of Fig. 1, a shaft speed of 600 R. P. M. will produce 20 spots 73 and 20 spots 75 per second.

The rotation of the turntable 67 is phased with respect to that of the antenna assembly 7 so that an observer looking at the reflection of the screen of the cathode ray tube 9 on the mirror 57 will see through only one of the polarizing sheets, for example the sheet 59, when the antenna 17 is operating. Suppose the plane of polarization of this sheet to be tilted to the left. The observer sees through the sheet 67, whose plane of polarization is tilted to the right, while the antenna 23 operates. The sheets 63 and 61, polarized to the left and to the right respectively, correspond similarly to the antennas 21 and 19.

The light reaching the observer from the pips 73 and 75 is plane polarized, 45 degrees to the left of vertical for the pip 73 and 45 degrees to the right of vertical for the pip 75. A pair of spectacles, not shown, are provided with light polarizing discs, with their planes of polarization turned 45 degrees to the right and to the left of vertical respectively. An observer wearing such spectacles will see only the pip 73 with one eye, and only the pip 75 with the other eye.

Suppose the left eye sees only the pip 73 and the right eye sees only the pip 75. The observer allows his eyes to adjust for stereoscopic vision, so that the two pips appear to fuse into a single image. The fused image will appear to be suspended in space between the observer and the reflected image of the screen of the cathode ray tube. The further apart the two component pips 73 and 75 are on the screen, the more the eyes must converge in order to merge them into a single subjective image. The effect of parallax for each display viewed by the corresponding eye is thus produced. This causes the merged pip to appear to stand out from the screen by an amount depending on the elevation angle of the target as seen from the antenna location. The effect is substantially that of a perspective view, looking down on the area scanned by the equipment.

Although the invention has been described as embodied in a radar system, it will be appreciated that its application is not limited to scanning with directional radio waves, but may be used with sound energy or any other energy capable of being directively transmitted or received by known means.

The scanning pattern of Fig. 5 may be provided by omitting the deflection coils 12 and the sawtooth generator 14, and rotating the coils 11 around the longitudinal axis of the tube 9 in synchronism with the rotation of the antenna asembly 7. This pattern is less distorted in its presentation than that of Fig. 4 since azimuth angles are approximately correct and the apparent altitude of a target is substantially unaffected by range.

The scanning system shown in Fig. 1 may be used for both transmission and reception as described, or for either function alone. By scanning in the same direction with two fan shaped beams whose planes are inclined rather than perpendicular with respect to the direction of scanning motion, it is possible to determine uniquely the direction in two coordinates, such as azimuth and elevation, of a line within the solid angle being scanned.

I claim as my invention:

1. A system for detecting and locating reflecting objects in three coordinates, including a transmitter, directive radiator means connected to said transmitter and providing two substantially plane fan-like directive patterns rotating in the same direction about a common axis with the plane of each inclined at an angle with respect to said axis, the angles of inclination being different whereby a reflecting object within the space scanned by said beams provides successively two reflections, one from each of said beams, receiver means responsive to said reflections, and indicator means connected to said receiver to provide two visible displays of the position of said object in two coordinates corresponding to the coordinates of said object in a plane, perpendicular to said common axis, each of said displays corresponding to the interception of one of said beams by said object, and said displays being displaced from each other thereby to introduce the effect of parallax in observing the displays individually, and means for viewing said displays stereoscopically to provide the visual impression of depth along the coordinate parallel to said common axis.

2. A system for detecting and locating reflecting objects in three coordinates such as range, azimuth and elevation, including a transmitter directive radiator means providing alternately two substantially plane fan-like directive patterns rotating in the same direction about a common axis with their planes inclined to said axis respectively on different sides thereof at acute angles of rotation, whereby a reflecting object within the space scanned by said beams provides two reflections, one from each of said beams, each of said reflections occurring at the end of a corresponding time interval after the respective beam points in a reference direction, the mean of said intervals being a measure of the position of said object in one of said coordinates, such as azimuth, and the difference between said intervals being a measure of the position of said object in another of said coordinates such as elevation; receiver means responsive to said reflections and indicator means connected to said receiver to provide two visible displays of the position of said object in two coordinates such as range and azimuth, each of said displays corresponding to the interception of one of said beams by said object, and means for viewing said displays stereoscopically to provide the visual impression of depth along the third of said coordinates.

HARLEY IAMS.

REFERENCES CITED

The following references are of record in the file of this patent:

UNITED STATES PATENTS

| Number | Name | Date |
| --- | --- | --- |
| 2,408,050 | De Rosa | Sept. 24, 1946 |
| 2,415,095 | Varian | Feb. 4, 1947 |
| 2,426,189 | Espenschied | Aug. 26, 1947 |
| 2,426,979 | Ayres (1) | Sept. 9, 1947 |
| 2,434,897 | Ayres (2) | Jan. 27, 1948 |
| 2,459,481 | Wolff | Jan. 18, 1949 |
| 2,468,751 | Hansen | May 3, 1949 |
| 2,484,822 | Gould | Oct. 18, 1949 |
| 2,518,968 | Wolff | Aug. 15, 1950 |
| 2,538,800 | Ranger | Jan. 23, 1951 |

FOREIGN PATENTS

| Number | Country | Date |
| --- | --- | --- |
| 582,007 | Germany | Oct. 19, 1932 |